3,172,917
Patented Mar. 9, 1965

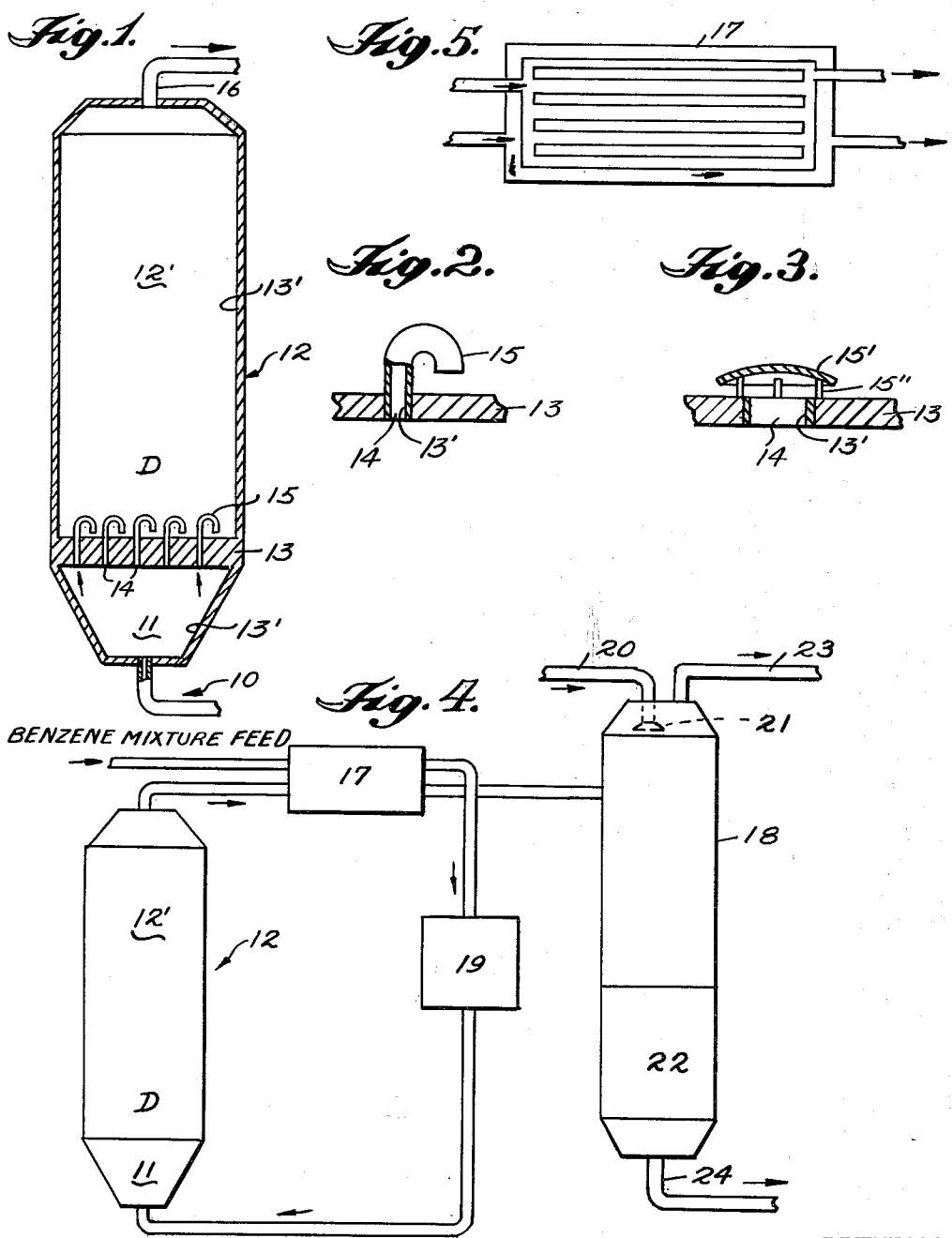

3,172,917
METHOD OF MANUFACTURING PHENOLS
Ben Dundee, 1 Highwood Way, Larchmont, N.Y., and Barney O. Strom, 3310 Balltown Road, Schenectady, N.Y.
Filed May 11, 1961, Ser. No. 109,461
3 Claims. (Cl. 260—621)

This application relates to the production of phenols from a hydrocarbon. More particularly, this application relates to the manufacture of phenols by oxidation of benzene and/or toluene in the vapour phase.

We have heretofore successfully accomplished this reaction with unexpectedly high yields of phenol by means of a fluidized bed reaction.

This operation has been successful, but there are instances where a fluidized bed may present problems and where the preference of the particular chemical plant would be toward a mechanical installation.

We are familiar with the Moyer Patents 2,367,731 and 2,222,383 which utilize a reaction chamber in which no practical means for accurate or consistent temperature control is provided. We have found that a precise temperature control is an absolute requisite to assure good yields. In brief, past efforts to produce a commercial yield of phenol by direct oxidation of benzene and toluene have not been feasible and have been unsuccessful because of the difficulty in controlling the reaction and especially the difficulty in controlling the temperature.

We are not entirely sure of the phenomena by which the invention now to be described unexpectedly produces high yields of phenol without the need of catalytic methods or fluidized bed apparatus and procedures.

Stated briefly, our present invention involves the introduction of an intimate mixture of benzene, toluene, or mixtures thereof with an oxygen-containing gas e.g. air, or pure oxygen into a reactor which is distinguished from the open chamber type of the Moyer patents, on the one hand, and on the other, from the fluid bed type of reactor, in that the intimate gas mixture at a relatively low temperature, e.g., 920° to 950° F. is caused to follow a multiplicity of confined paths or passages and emerges into the reaction chamber preferably after its initial direction of movement has been changed. It appears that the gaseous mixture introduced into the reaction chamber at the elevated temperature above-mentioned, e.g. 935° F. and preferably having had its direction of movement modified, (1) expands instantly because of the relatively greater area of the reaction chamber as compared to any one of the smaller passages, and (2) the expansion of the mixture is accomplished by an accelerated diffusion or mixing of the gases as they emerge into and continue in intimate admixture in the expansion chamber. That is, instead of the reaction between the hydrocarbon and the oxygen-containing gas taking place only in that immediate area of expansion and diffusion, the reaction is delayed for a relatively short time and not only occurs but continues from a point substantially spaced from the expansion and diffusion zone in a totally unexpected manner. The intimate gas mixture is introduced to the passages in the chamber while under pressure and the pressure continues when, as preferred, the path of the gas mixture is modified. This pressure is always sufficient to assure that there will be no return of the mixture into the passages from the expansion and diffusion area, on the one hand, and, on the other, that the diffusion gas product is caused to travel in the reaction chamber toward the outlet end thereof at all times. Unexpectedly, not only is the yield of phenol high, and the formation of by-products normally encountered in such reactions substantially reduced, but a careful study of what takes place within the reaction chamber, shows two things: (1) that if expansion of the gas mixture is not substantially instantaneous, heavy carbonizing results which clogs the passageways and also forms an undesirable contact mass which cuts down the yield and increases unwanted by-products, and (2), this instantaneous expansion, preferably combined with changing or modifying the path of the gas mixture, retards or delays the ultimate reaction for what in our opinion we call for want of a better descriptive terminology, a preparatory period, so that at a definite distance above the diffusion and expansion zone, the reaction takes place and continues to the outlet end of the reaction chamber. There is a very definite area in this travel where the initial temperature of the introduced mixture remains substantially constant and after it has travelled through the preparatory period or space, the temperature shows a definite rise, which continues throughout the remainder of the travel in the reaction chamber until at the time of withdrawal it has reached, for instance, about 1100° to 1150° F. We believe that the completion of the reaction increases the farther away the reaction mixture is from the diffusion and expansion zone D and as the temperature of the mixture rises.

In the drawings:
FIGURE 1 is a cross-sectional view of a reactor suitable for the practice of our invention;
FIGURE 2 is an enlarged view of one embodiment of means for changing direction of travel of the gas mixture entering the reaction zone of the reactor of FIGURE 1;
FIGURE 3 is an enlarged view similar to FIGURE 2 of another embodiment of means for changing direction of travel of the gas mixture;
FIGURE 4 is a diagrammatic illustration of a preferred method of operation of this invention;
FIGURE 5 is an enlarged view of the heat exchanger shown in FIGURE 4.

The following is a specific example of the operation of this invention: A mixture of 65% benzene and 35% air by volume at a temperature of 920° F. and under a pressure of about 61 pounds p.s.i.g. is introduced through the pipe 10 into the distributing area 11 of a suitable reactor 12. This reactor is made of stainlss steel and the interior of the same is made inert to the reaction by means of an aluminum coating or a coating of some other equally inert non-catalytic material 13' relative to the reaction. The distributing area 11 and the reaction area indicated by the numeral 12' are separated by a stainless steel plate 13 which defines the top of the gas distributing chamber 11. This plate is similarly coated with an inert non-catalytic material 13' and is preferably made of stainless steel. The plate is provided with a multiplicity of passages 14 which open at their lower ends or inlet side into the distributing chamber 11 and at their upper ends or outlet side into the reaction chamber 12'. At their upper ends, the passageways 14 are preferably provided with means, e.g., reversely bent pipes 15 for changing the direction of travel. The openings in said pipes 15 are spaced above the passages 14 a distance to assure thorough and spontaneous diffusion without retarding flow from the passages 14 or causing any return through the same. That is, the mixture emerging from the passageways 14 would normally be directed upwardly without any restrictions. We have found that if this upward path is modified or diverted or changed in some fashion to take advantage of the expansion which takes place when the gases emerge from the small passages 14 (which are about 5/8 inch in diameter) into the larger reaction area 12' (which is about 20 inches in diameter), the new and improved result of this invention is even further improved. That is, a greater yield of phenol is obtained and a lesser yield of unwanted products results. However, the expansion factor alone together with the velocity of the gas emerging from the passageways 14, which is about 20 feet per second, results in a very pronounced and effective diffusion of the multiplicity of streams of gas mixture in the area adjacent to and contiguous to the plate or separator member 13. Illustrative of our observations, is the fact that the mixture introduced at 920° F. under 61 pounds pressure p.s.i.g. to the distributing chamber 11 emerges from the passageways 14 into the expansion-reaction area 12' at a velocity of 20 feet per second and without suffering any substantial rise in temperature, namely, the temperature remains about 920° F. The temperature of the diffused mixture from the numerous outlets does not show any substantial increase in temperature while travelling upwardly in the chamber 12' until this diffused mass is about 30 to 36 inches above the diffusion area D identified as proximate above the plate 13 and its passageways. We observed that at a point about 3 feet above the plate 31, a temperature rise became appreciable and this rise continued as the mixture travelled upwardly in the chamber 12' to the outlet 16. The temperature adjacent the outlet 16 was 1100° F. and the pressure remained at substantially 60 p.s.i.g., the loss of one pound being occasioned by the drop through the plate 13.

There was no return of the diffused mixture or of the reaction mixture through the plate 13 because the pressure at all times was sufficient to maintain the flow of gases upwardly toward the outlet and there was observed no carbonization or side reactions of an appreciable nature.

We find that the reactive effect at least first occurs where the temperature range is about 100° F. more or less above the temperature at which the mixture was introduced to and left the plate 13 through its passages 14 into the reaction chamber.

By carrying out the aforesaid procedure we were able to obtain a phenol recovery of 50% phenol based on the benzene attack and usually the yield is well above 50%.

In addition, we ar able to obtain by the operation of this process about one part of diphenyl to two parts of phenol. This can be altered readily by varying the ratios of benzene to air or other oxygen-containing gas which is related precisely to the partial pressure of oxygen in the reaction zone.

While we have indicated that the temperature of the mixture introduced to the reaction chamber is about 920° F., this can be varied and we have successfully carried out the foregoing operation by introducing the gases at 950° F. In fact, the temperatures useful for introducing the mixture may be between 900° and 1000° F. with the pressure at about 60 pounds. Where the pressure is higher, the temperature range is proportionately less and when the pressure is lower the temperature levels are higher. It is preferable to operate at a temperature range of 920° to 950° F. and under about 60 pounds pressure as described above, but pressures can be increased to as much as 45 atmospheres with temperatures as low as 750° F. and the pressures may be decreased as low as atmospheric pressure with the temperature of the mixture introduced being under such circumstances elevated to 1100° F. We have operated at about 80 pounds pressure and at a temperature of about 900° F. and our experimental results indicate that we can commercially operate at 170 pounds pressure and a temperature of about 900° F. and possibly a little lower. As can be appreciated, the equipment from various manufacturers varies and various plants prefer one type of equipment over another, so that the present invention in addition to its other advantages, has a marked flexibility for practical commercial purposes.

Concerning the content of the mixture, the hydrocarbon can vary from 30% to 80% and the air or other oxygen-containing gas from 70% to 20%, by volume.

We prefer the openings in passages 14 in the coated stainless steel plate 13 to have a dimension of about ⅝ of an inch, but they can be of any desired size, commensurate with imparting an operational velocity which we have found may vary between 14 feet per second up to as high as 25 feet per second.

The number of passages does not appear to be critical in that successful operation takes place with 75 to 400 or 500, depending upon the diameter of the reaction vessel and we have obtained results which indicate that in a chamber which is 20 inches in diameter, 64 passages in the plate 13 are adequate to give desired results. As the inside diameter of the reaction vessel increases, the number of openings may be similarly increased.

The height of the reaction vessel or its length should be such as to provide the desired preparatory period preliminary to the more active reaction described above, and we find that in a vessel which has the chamber 12' extending about 7 feet above the plate 13 and 20 inches inside diameter, the reaction initiates at about 36 inches above the plate 13 and continues to the outlet 16.

The means for changing the path of the gases as they leave the passages 14 when the preferred form of the invention is followed, may take a variety of forms. In FIGURE 2, we have shown the simple form wherein each passage has a pipe or chimney 15 attached to the same and formed to have a 180° bend. On the other hand, in FIGURE 3, we have shown the passages provided with caps 15' mounted on legs 15" so that the gases emerging from the passages strike these caps and as they expand are likewise diffused in the area D proximate to the plate 13. Any suitable means which will modify the direction of motion of gases emerging from the passages 14 whereby the simultaneous expansion and diffusion effect is accelerated adjacent the plate 13, i.e., immediately above the same are satisfactory and the two forms we have described are merely for purposes of illustration.

When the gas under the pressure recited and the velocities indicated, emerges from the passages 14 which are of relatively small dimension (⅛ to ¾ inch in diameter) into the larger reaction area 12', which is 20 inches in the present example, a very active and spontaneous expansion and diffusion occurs and we are thereby able to avoid the necessity for using a fluid bed.

In addition to the foregoing, it was quite unexpected in the actual carrying-out of this invention that the flaming occasioned by the heat of reaction did not occur at and about the plate 13 i.e., in the area D. On the contrary, as mentioned above, the flaming initially took place in the reactor which had a height of approximately 7 feet above the plate, at a point about 3 feet above the plate, i.e., the flaming initiated at this 3 foot location and then continued upward toward the exit end 16 of the reaction chamber.

We have observed after considerable experimentation that where the gases introduced to the distributing chamber 11 are preheated in contact with an aluminized surface, the degradation of benzene to carbon is substantially minimized and we prefer that the gases be preheated under such a condition. If aluminized coatings are not available in the preheater, which may be the usual conventional gas or oil-fired convection furnace or tube heater, other coating materials may be employed which are insert and non-catalytic, but an aluminum contact surface for the gases being preheated has been found preferable in our actual operations where we observed that coating occurred on uncoated steel at temperatures approaching 800° F. This same preheating step is utilized in connection with a fluidized bed operation.

It has been discovered that in a fluidized bed operation whereas a flaming or reaction zone is immediately above and contiguous to the fluid bed, in the present invention, in which a mechanical treatment is employed, namely the expansion-diffusion operation which prepares the gases for the flaming reaction, the latter reaction takes place at a point spaced substantially above the diffusion-expansion area D which has been described above.

The reaction product leaves the reactor 12 through the outlet 16 and this reaction product consists of phenol, unreacted benzene, diphenyl, nitrogen and oxygen and has a temperature of at least 1050° F. and which may be as high as 1300° F. It is preferable to cool this gas mixture quickly and we have discovered a very effective way of accomplishing this which will prevent the preliminary condensation of undesirable polymers at an objectionable point, on the one hand, and will afford the quickest type of quench for the hot gas mixture, on the other. This is accomplished as shown in FIGURE 4 by passing the hot mixture having a temperature of about 1100° F. through a tubular heat exchanger 17, the tubes and shells of which have been coated with aluminum as above-described to preclude any possibility of carbonizing and catalytic side reactions. While it is customary to use conventional heat exchangers in which countercurrent heating and cooling are resorted to, the heat exchanger 17 is distinguished in that the cooling gas, namely, the mixture of benzene and air to be supplied to the reactor 10, passes through the heat exchanger in the same direction as does the reaction gas from the reaction reactor 12 as indicated by the arrows in FIGURE 5. This parallel travel of the heat exchanging gaseous fluids accomplishes the necessary cooling and in addition, enables us to preheat the gaseous mixture before it is introduced to a preheating furnace for subsequent introduction to the reactor. In this connection, we have noted that the temperature in the heat exchanger 17 is preferably at all times maintained with respect to the reacted gas mixture at about 700° F. or more to preclude carbonization and the crude mixture of benzene and air is introduced to this heat exchanger at a temperature of about 350° F. so that the critical 700° F. temperature is maintained for the reaction gases and they have that temperature according to our observation when they leave the heat exchanger for treatment in a scrubber condenser 18 shown in FIGURE 4. The raw gas mixture leaves the heat exchanger by reason of this parallel heat exchange travel at a temperature of about 680° F. and therefore when transferred to the furnace 19, it is possible to economically and quickly heat the raw mixture to a temperature of 900° F. for above, i.e., whatever temperature is desired prior to entering the reactor. In the scrubber condenser, the phenol, diphenyl and benzene are condensed in the conventional manner and subsequently separated, all as well known in the art, no claim being made to this.

Referring further to FIGURE 4, the scrubber condenser is of the type wherein cold benzene from inlet 20 is sprayed at 21 directly into the gaseous reaction mixture having a temperature of about 700° F., the benzene having a temperature in the neighborhood of 100° F. In this manner, the phenol, diphenyl and a substantial amount of benzene are condensed and recovered in the lower section of the scrubber 18 as at 22 and some benzene is vaporized in the treatment and leaves through the top of the scrubber at 23 where the benzene vapour is led to a suitable condenser and cooled for further use in the scrubber condenser. The condensed phenol, diphenyl and benzene having a temperature in the neighborhood of 350° F. are removed through the outlet 24 to a suitable distillation apparatus of conventional form where the constituents are separated for further use and recovery.

From the foregoing description of the invention, we believe it will be clear that the heated gas mixture of hydrocarbon and oxygen-containing gas undergoes compression and an increase in velocity as it travels through the relatively narrow passages in plate 13. When the gas streams emerge from the passages, whether their direction of travel be changed or not, there occurs at once an expansion and diffusion of the gas mixture in the zone D. Thereafter, at a point removed from the zone D the reaction is initiated and continues until the mixture is removed through the outlet 16. At this point the reaction has proceeded in a most efficient manner whereby it is possible to recover 50% or more of the reaction product as phenol. As explained, it is preferable to accelerate in some cases the expansion and diffusion by the means described above.

Although we have referred to air as the oxygen-containing gas, air enriched with oxygen as well as pure oxygen are useful and the term therefore is considered to embrace these materials in the appended claims. While we have referred specifically to benzene and toluene and mixes of the same, it is to be understood that the term hydrocarbon in the appended claims is intended to embrace other known hydrocarbons which can be similarly treated to obtain an increased yield of desirable products.

What is claimed is:

1. A method of producing a phenol from a hydrocarbon selected from the group consisting of toluene, benzene and mixtures thereof which comprises passing a gaseous mixture of the hydrocarbon and an oxygen containing gas at a temperature of 750 to 950° F. through multiple confined passages, discharging the mixture from said passages into a single reaction chamber of substantially greater area than the area of any one of said passages and thereby reducing the pressure thereof by expanding the mixture, simultaneously changing the direction of flow of the mixture in the zone of introduction into said reaction chamber, diffusing the gases as they emerge from said multiple confined passages into intimate admixture, and passing said admixture into a single zone of said reaction chamber wherein reaction is maintained at a temperature at least 100° F. above the temperature of introduction of the gaseous mixture into the reaction chamber and at a temperature of 1000 to 1150° F. whereby exothermic oxidation takes place and a phenol is formed, and recovering said phenol.

2. A method according to claim 1 wherein the hydrocarbon is benzene.

3. A method according to claim 2 wherein the temperature of said reaction zone is maintained at 1020 to 1100° F.

References Cited in the file of this patent

UNITED STATES PATENTS

| | | |
|---|---|---|
| 2,199,585 | Bone et al. | May 7, 1940 |
| 2,223,383 | Moyer et al. | Dec. 3, 1940 |
| 2,392,875 | Porter | Jan. 15, 1946 |